United States Patent [19]
Foster

[11] 3,919,896
[45] Nov. 18, 1975

[54] MOTORCYCLE GEARSHIFT LEVER

[76] Inventor: Owell G. Foster, P.O. Box 28, Bowdon, Ga. 30108

[22] Filed: June 13, 1974

[21] Appl. No.: 479,165

[52] U.S. Cl. .................. 74/474; 74/512; 74/560; 180/33 B
[51] Int. Cl.² .................. G05G 1/14; G05G 9/12
[58] Field of Search .......... 74/474, 512, 478, 478.5, 74/560, 594.4, 594.6; 180/33 R, 33 A, 33 B

[56] References Cited
UNITED STATES PATENTS

| | | | |
|---|---|---|---|
| 1,821,543 | 9/1931 | Coultas | 74/512 X |
| 2,033,433 | 3/1936 | Leupold | 74/512 X |
| 3,853,020 | 12/1974 | Clark | 74/474 X |

Primary Examiner—Allan D. Herrmann
Attorney, Agent, or Firm—Jones, Thomas & Askew

[57] ABSTRACT

A foot-actuated gearshift for a motorcycle is disclosed wherein a lever rigidly connected at one of its ends to a rotatable shaft includes a foot pedal extending laterally from its distal end portion and a toe pedal which extends over the foot pedal, wherein the toe portion of a shoe can fit between the foot pedal and the toe pedal and the toe portion of the foot can be lifted against the toe pedal to pivot the lever upwardly or depressed against the foot pedal to pivot the lever downwardly.

8 Claims, 4 Drawing Figures

MOTORCYCLE GEARSHIFT LEVER

BACKGROUND OF THE INVENTION

Most motorcycle gearshift assemblies in recent years have been fabricated with a foot pedal that is shifted upwardly and downwardly by the bottom and top surfaces of the toe of the foot. The heel portion of the rider's foot normally rests on a stationary stirrup or foot rest which bears most of the weight of the leg and foot of the rider, while the pedal mounted on the end of a lever is positioned in front of and slightly lower than the foot rest at a location where the rider can merely depress or lift the toe portion of his foot with a pivotal movement about his ankle joint to shift the gears of the motorcycle.

While the motorcycle foot gearshift assembly has met with substantial success since it frees the hands of the motorcycle rider from the duties of shifting gears, the toe portion of the foot must still be maneuvered laterally from above and from below the foot pedal to downshift and upshift gears, which requires concentration for the inexperienced rider and hesitation for most riders when the toe of the foot happens to be on the wrong surface of the pedal. Also, if the rider should inadvertently shift through a gear, he must reposition his foot with respect to the foot pedal before he can shift back to the desired gear.

SUMMARY OF THE INVENTION

Briefly described, the present invention comprises a foot gearshift lever for motorcycles which includes a foot pedal to receive downward force applied by the toe portion of the foot and a toe pedal located above the foot pedal to receive upward force applied by the toe portion of the foot whereby the foot can shift the gears of the motorcycle without being repositioned with respect to the gearshift lever.

Thus, it is an object of the present invention to provide a foot-actuated gearshift assembly for motorcycles that allows the gears to be shifted without repositioning the foot of the rider with respect to the foot pedal and which is inexpensive to manufacture and convenient to use.

Other objects, features and advantages of the present invention will become apparent upon reading the following specification, when taken in conjunction with the accompanying drawing.

DETAILED DESCRIPTION

Figure 1:
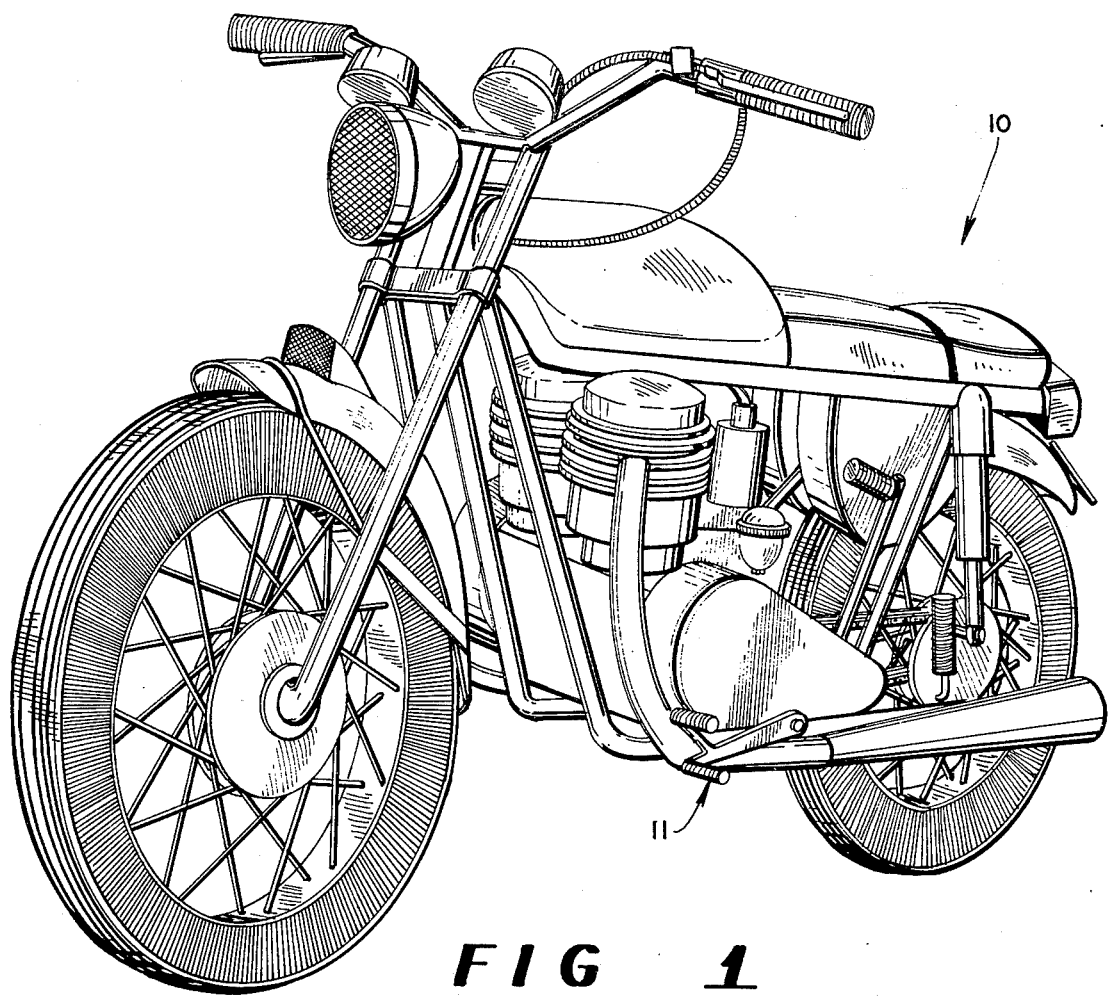
FIG. 1 illustrates a motorcycle of the type which includes the foot-actuated gearshift assembly of the present invention.
Figure 2:
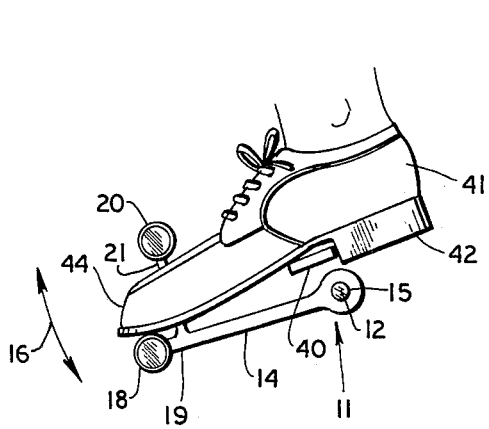
FIG. 2 is a side elevational view of the foot of a motorcycle rider as it engages the gearshift lever assembly.

Referring now in more detail to the drawing, in which like numerals indicate like parts throughout the several views, FIG. 1 shows a motorcycle 10 that includes the gearshift assembly 11. As is illustrated in FIG. 2, the gearshift assembly 11 is rigidly connected at one of its ends to the normally laterally extending shaft 12 of the transmission (not shown) of the motorcycle. The gearshift lever 14 defines an opening 15 at one of its ends, and the opening is inserted about the transmission shaft 12. The opening 15 is internally splined and mates with the external splines of shaft 12, so that lever 14 is pivotal in the direction as indicated by arrows 16 about the longitudinal laterally extending axis of shaft 12.

Foot pedal 18 is mounted on the distal end portion 19 of lever 14 and extends laterally at approximately a right angle from the lever 14 in a direction approximately parallel to the longitudinal axis of shaft 12. Toe pedal 20 is also mounted on lever 14 and is positioned over foot pedal 18. Toe pedal 20 also extends laterally in a direction approximately parallel to foot pedal 18 and shaft 12. In the embodiment of the invention illustrated in FIG. 2, support leg 21 is integrally formed with lever 14 and is located in the same plane as lever 14, and toe pedal 20 is permanently supported at the upper end of support leg 21 and extends at a right angle from support leg 21 in a fixed relationship with respect to foot pedal 18.

Figure 3:
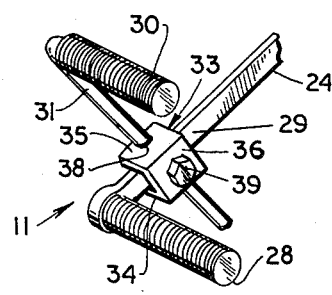
FIG. 3 shows a modified form of the invention and is a detail perspective illustration of one side of the gearshift lever assembly.

As is illustrated in FIG. 3, where an alternate form of the gearshift assembly 11 is disclosed, lever 24 also includes foot pedal 28 mounted on its distal end 29, and toe pedal 30 is mounted on lever 24 and is positioned above and approximately parallel to foot pedal 28. Toe pedal 30 extends at approximately a right angle from support leg 31, and support leg 31 is releasably connected to lever 24 by clamp 33. Clamp 33 is U-shaped and includes side legs 34 and 35 and base leg 36, and side legs 34 and 35 define openings 38 in their end portions. The support leg 31 of toe pedal 30 extends through the openings 38 in the side legs 34 and 35 behind lever 24. Setscrew 39 extends through an internally threaded opening (not shown) in the base leg 36 of clamp 33 and engages lever 24. When setscrew 39 is tightened, clamp 33 is drawn away from lever 24, which draws the support leg 31 of toe pedal 30 into the lever and rigidly mounts the toe pedal on lever 24. The openings 38 in side legs 34 and 35 are offset from one another, as is illustrated in FIG. 4, so that support leg 31 is angled toward the end portion of lever 24, which positions toe pedal 30 above foot pedal 28.

A foot rest 40 (FIG. 2) is positioned adjacent the pivotal end of lever 14 above transmission shaft 12, and the rider usually places his foot 41 on the foot rest 40 with the heel 42 of his shoe engaging the foot rest. This usually places the toe 44 of the shoe or foot in a position between foot pedal 18 and toe pedal 29 (FIG. 2). The angle that lever 14 makes with respect to the horizontal is such that foot pedal 28 is located in a position where it can be engaged by the natural pivotal movement of the toe portion 44 of the foot about the foot rest 40, as indicated by arrows 16, and not much, if any, weight of the foot or other portions of the body of the rider will naturally engage the foot pedal 18 until the rider consciously pushes down with the toe portion of his foot to shift gears. Also, toe pedal 20, which is positioned above foot pedal 18, is located within the arc of movement of the toe when pivoted about the ankle joint and foot rest 40, so that the gears of the motorcycle are not likely to be shifted unconsciously.

Figure 4:
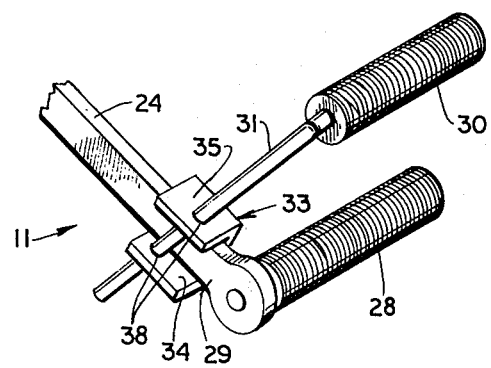
FIG. 4 also shows the modified form of the invention and is a detail perspective illustration of the gearshift lever assembly, but showing the opposite side from that shown in FIG. 3.

When the adjustable gearshift assembly of FIGS. 3 and 4 are utilized, the distance between foot pedal 28 and toe pedal 30 can be adjusted, by loosening setscrew 39 to relieve the clamping force of clamp 33, and by shifting support leg 31 of toe pedal 30 downwardly through the openings 38 in clamp 33, and then retightening the setscrew. In addition, the location of toe pedal 30 along the length of lever 24 can be adjusted in a similar manner, by loosening setscrew 39 and sliding clamp 33 along the length of the lever, and then retightening the setscrew.

While clamp 33 functions as a clamping means to rigidly and releasably mount toe pedal 30 on lever 24 above foot pedal 28, it will be understood by those skilled in the art that various different clamp means can be utilized, as may be desired. Moreover, while specific foot pedals 18 and 28 and toe pedals 20 and 30 have been illustrated, it should be understood that other forms of upper and lower foot engaging means can be utilized for engagement by the toe portion of the foot without departing from the scope of the invention, and while this invention has been described in detail with particular reference to preferred embodiments thereof, it will be understood that variations and modifications can be effected within the spirit and scope of the invention as described hereinbefore and as defined in the appended claims.

I claim:

1. A foot actuated gearshift for a motorcycle comprising a lever rigidly connected at one of its ends to a laterally extending rotatable shaft for pivotal movement with said shaft, a foot pedal projecting laterally from the distal end portion of said lever for downward force by a foot to pivot the lever downwardly about the axis of said shaft, and a toe pedal mounted on said lever above said foot pedal and projecting laterally with respect to said lever over said foot pedal for upward force by the foot to pivot the lever upwardly about the axis of said shaft.

2. The gearshift of claim 1 and wherein said toe pedal is releasably connected to said lever and is movable along the length of said lever.

3. The gearshift of claim 1 and wherein said toe pedal is releasably connected to said lever and is movable toward and away from said foot pedal.

4. The gearshift of claim 1 and further including clamp means releasably mounting said toe pedal on said lever.

5. In a gearshift mechanism for a motorcycle including a lever pivotable at one of its ends about a usually horizontal axis and a foot pedal at its other end for downward engagement by a foot to pivot the lever downwardly about said axis, the combination therewith of a toe pedal mounted for movement in unison wiht said lever at a position above said foot pedal for upward engagement by the foot to pivot the lever upwardly about said axis, both said foot pedal and said toe pedal extending generally in the same lateral direction from said lever, and said toe pedal being releasibly connected to said lever and movable along the length of said lever.

6. The combination of claim 5 and wherein said toe pedal comprises a support leg, a U-shaped clamp including a base leg and side legs extending about said lever with the end portions of the side legs protruding beyond said lever and defining openings therein, and said support leg extending through said openings, and a setscrew extending through the base leg of said clamp and engaging said lever.

7. In a gearshift mechanism for a motorcycle including a lever pivotable at one of its ends about a usually horizontal axis and a foot pedal at its other end for engagement by a foot to pivot the lever about the axis, the invention comprising a toe pedal attachment for rigid connection to the lever comprising a toe pedal, a support leg extending at approximately a right angle with respect to said toe pedal, and clamping means for releasably connecting said support leg to the lever.

8. The invention of claim 7 and wherein said clamping means comprises a U-shaped clamp with a base leg and opposed side legs for extension about the lever with openings formed in the end portions of said side legs, a threaded opening extending through said base leg, and a setscrew extending through said threaded opening, whereby the clamp is fitted about the lever, the support leg is inserted through the openings formed in the end portions of the side legs of the clamp, and the setscrew is screwed in through the threaded opening of said base leg into engagement with the lever to rigidly mount the support leg and toe pedal on the lever.

* * * * *